US006871246B2

(12) United States Patent
Moyer

(10) Patent No.: US 6,871,246 B2
(45) Date of Patent: Mar. 22, 2005

(54) PREFETCH CONTROL IN A DATA PROCESSING SYSTEM

(75) Inventor: William C. Moyer, Dripping Springs, TX (US)

(73) Assignee: Freescale Semiconductor, Inc., Austin, TX (US)

(*) Notice: Subject to any disclaimer, the term of this patent is extended or adjusted under 35 U.S.C. 154(b) by 0 days.

(21) Appl. No.: 10/431,285

(22) Filed: May 7, 2003

(65) Prior Publication Data

US 2004/0225758 A1 Nov. 11, 2004

(51) Int. Cl.[7] .............................................. G06F 13/38
(52) U.S. Cl. ......................................... 710/74; 710/306
(58) Field of Search .............................. 710/6, 20, 22, 710/35, 74, 110, 306, 308, 310, 311; 711/126, 137

(56) References Cited

U.S. PATENT DOCUMENTS

| | | | | |
|---|---|---|---|---|
| 5,675,749 A | * | 10/1997 | Hartvigsen et al. | 710/305 |
| 5,829,028 A | | 10/1998 | Lynch et al. | 711/126 |
| 5,940,857 A | | 8/1999 | Nakanishi et al. | 711/137 |
| 6,085,291 A | * | 7/2000 | Hicks et al. | 711/137 |
| 6,138,213 A | | 10/2000 | McMinn | 711/137 |
| 6,151,662 A | * | 11/2000 | Christie et al. | 711/145 |
| 6,347,055 B1 | * | 2/2002 | Motomura | 365/189.05 |
| 6,434,691 B2 | | 8/2002 | Murakami et al. | 712/205 |
| 6,453,388 B1 | | 9/2002 | Gonzales et al. | 711/137 |
| 6,564,286 B2 | * | 5/2003 | DaCosta | 711/103 |
| 6,636,927 B1 | * | 10/2003 | Peters et al. | 710/309 |

FOREIGN PATENT DOCUMENTS

EP        0 604 139        10/2001

* cited by examiner

Primary Examiner—Jeffrey Gaffin
Assistant Examiner—Harold Kim
(74) Attorney, Agent, or Firm—Joanna G. Chiu; Susan C. Hill

(57) ABSTRACT

A data processing system (10) includes an interconnect (22) where a first interconnect master (12) and a second interconnect master (14) are coupled to the interconnect. A shared storage (35) is coupled to the interconnect for use by the first and second interconnect masters. The data processing system also includes a first control storage circuit (60, 64) which corresponds to the first interconnect master and a second control storage circuit (62, 66) which corresponds to the second interconnect master. In one embodiment, prefetch circuitry (40) is coupled to the first control storage circuit and to the second control storage circuit for selecting one of the first and second control storage circuits based upon which one of the first and second interconnect masters is requesting an access to the shared storage. The prefetch circuitry can then use the selected control storage circuit to determine a prefetch operation triggered by the access to the shared storage.

23 Claims, 3 Drawing Sheets

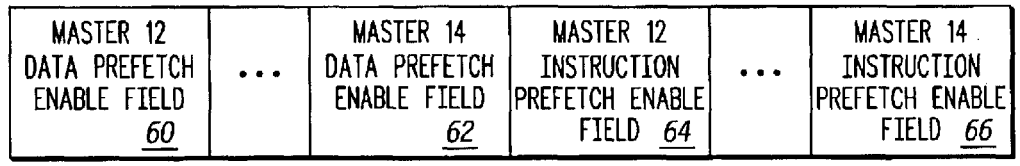

| | | CONTROL REGISTER 38 |
|---|---|---|
| MASTER 12 DATA PREFETCH ENABLE FIELD 60 | ... MASTER 14 DATA PREFETCH ENABLE FIELD 62 | MASTER 12 INSTRUCTION PREFETCH ENABLE FIELD 64 ... MASTER 14 INSTRUCTION PREFETCH ENABLE FIELD 66 |

*FIG.2*

| NAME | DESCRIPTION | SETTINGS |
|---|---|---|
| DATA PREFETCH ENABLE (DPEN) FIELDS 60 AND 62 | MASTER X DATA PREFETCH ENABLE – THESE FIELDS ARE USED TO CONTROL WHETHER PREFETCHING MAY BE TRIGGERED BASED ON THE MASTER ID OF A REQUESTING MASTER. THIS FIELD ENABLES OR DISABLES PREFETCHING INITIATED BY A DATA READ ACCESS. | 00 – NO PREFETCHING IS TRIGGERED BY A DATA READ ACCESS FROM THIS MASTER<br>01 – PREFETCHING MAY BE TRIGGERED ONLY BY A DATA BURST READ ACCESS FROM THIS MASTER<br>10 – RESERVED<br>11 – PREFETCHING MAY BE TRIGGERED BY ANY DATA READ ACCESS FROM THIS MASTER |
| INSTRUCTION PREFETCH ENABLE (IPEN) FIELDS 64 AND 66 | MASTER X INSTRUCTION PREFETCH ENABLE – THESE FIELDS ARE USED TO CONTROL WHETHER PREFETCHING MAY BE TRIGGERED BASED ON THE MASTER ID OF A REQUESTING MASTER. THIS FIELD ENABLES OR DISABLES PREFETCHING INITIATED BY AN INSTRUCTION READ ACCESS. | 00 – NO PREFETCHING IS TRIGGERED BY AN INSTRUCTION READ ACCESS FROM THIS MASTER<br>01 – PREFETCHING MAY BE TRIGGERED ONLY BY AN INSTRUCTION BURST READ ACCESS FROM THIS MASTER<br>10 – RESERVED<br>11 – PREFETCHING MAY BE TRIGGERED BY ANY INSTRUCTION READ ACCESS FROM THIS MASTER |

*FIG.3*

PREFETCH CONTROL IN A DATA PROCESSING SYSTEM

FIELD OF THE INVENTION

The present invention relates to a data processing system, and more particularly, to prefetch control within a data processing system.

RELATED ART

Prefetching is commonly used to access information within a data processing system. By prefetching information in advance of a request for that information, the latency caused by accessing the information requested by the bus master may be reduced. However, in typical prefetching schemes a number of prefetches are wasted since the bus master may not request access to the prefetched information. Another disadvantage of general prefetching schemes is that the prefetch operation requires some portion of the available memory bandwidth, which may interfere with demand fetches requested by the bus master. Therefore, a need exists for a method of prefetching that reduces the number of prefetches that are wasted and prevents unnecessary interference with data processor functions, resulting in a reduced amount of power consumption and an optimization of data processor performance.

BRIEF DESCRIPTION OF THE DRAWINGS

The present invention is illustrated by way of example and not limited by the accompanying figures, in which like references indicate similar elements, and in which:

FIG. 2 illustrates, in block diagram form, a control register of the data processing system of FIG. 1, in accordance with one embodiment of the present invention;

FIG. 3 illustrates, in table form, field descriptions of the control register of FIG. 2, in accordance with one embodiment of the present invention.

Figure 1:
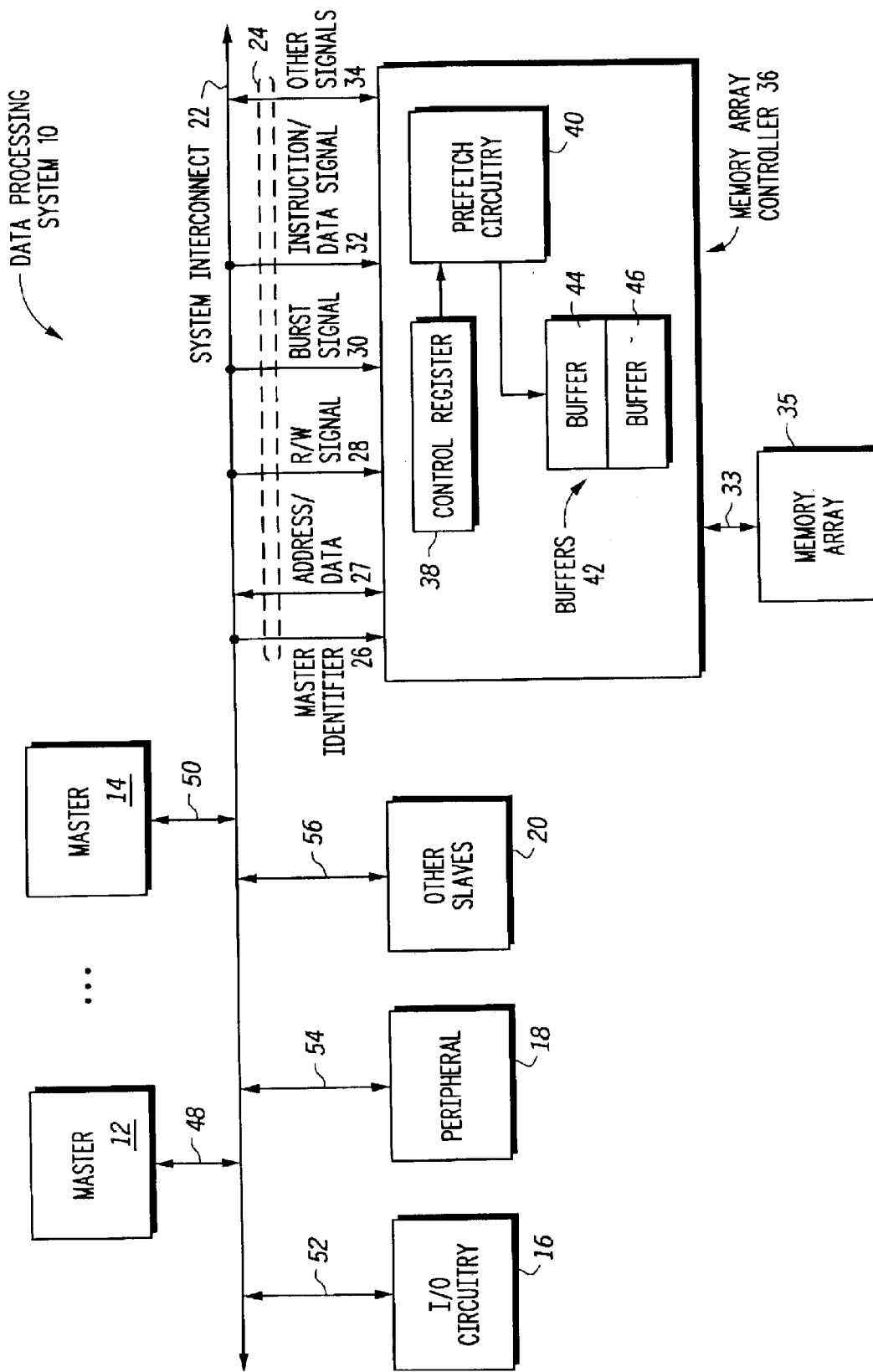
FIG. 1 illustrates, in block diagram form, a data processing system in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

One embodiment of the present invention relates to selective prefetch control within a data processing system. For example, within a multi-master data processing system, prefetch operations may be triggered by an access request (e.g. a read access request, also referred to as a demand fetch) by a master based on such attributes as, for example, the identity of the master making the access request and the type of access request (e.g. whether the access request is for data or instruction or whether the access request is a burst or non-burst access). The prefetch operations can be determined or controlled through the use of a prefetch control register (or other prefetch control storage circuitry) capable of storing prefetch control information associated with, for example, each master within the data processing system. In some embodiments, a prefetch operation may include inhibiting prefetch such that no prefetch occurs. By selectively controlling prefetch within the data processing system, wasted prefetches, which consume excess power and result in lower performance, can be prevented.

One embodiment of the present invention relates to a data processing system having an interconnect, a first interconnect master coupled to the interconnect, a second interconnect master coupled to the interconnect, a shared storage coupled to the interconnect for use by the first interconnect master and the second interconnect master, a first control storage circuit which corresponds to the first interconnect master, a second control storage circuit which corresponds to the second interconnect master, and prefetch circuitry coupled to the first control storage circuit and to the second control storage circuit. The prefetch circuitry selects one of the first and second control storage circuits based upon which one of the first and second interconnect masters is requesting an access to the shared storage and uses the selected control storage circuit to determined prefetch operation triggered by the access to the shared storage.

Another embodiment of the present invention relates to a method for providing prefetch control in a data processing system. In this embodiment, an access request to access storage is received, a prefetch control storage circuit is provided to store prefetch burst access control information, and a prefetch to the storage is selectively initiated based upon the burst access control information and whether the access request is a burst access.

Yet another embodiment of the present invention relates a method for providing prefetch control in a data processing system in which a first interconnect master is provided, a second interconnect master is provided, an access request to access shared storage is received, a prefetch control storage is selected based upon whether the access request is from the first interconnect master or the second interconnect master, control information stored in the prefetch storage circuit is used to control a prefetch operation triggered by the access request to the shared storage.

FIG. 1 illustrates one embodiment of a data processing system 10. Data processing system 10 includes, a master 12 (also referred to as an interconnect master 12), a master 14 (also referred to as an interconnect master 14), a memory array controller 36, a system interconnect 22, I/O circuitry 16, a peripheral 18, other slaves 20, and a memory array 35. Master 12 is bidirectionally coupled to system interconnect 22 via conductors 48, master 14 is bidirectionally coupled to system interconnect 22 via conductors 50, I/O circuitry is bidirectionally coupled to system interconnect 22 via conductors 52, peripheral 18 is bidirectionally coupled to system interconnect 22 via conductors 54, other slaves 20 is bidirectionally coupled to system interconnect 22 via conductors 56, and memory array controller 36 is bidirectionally coupled to system interconnect 22 via conductors 24. Conductors 24 include conductors for communicating a master identifier 26, address/data 27, a R/W signal 28, a burst signal 30, an instruction/data signal 32, and other signals 34. Memory array controller 36 includes a control register 38, prefetch circuitry 40, and buffers 42, and is bidirectionally coupled to memory array 35 via conductors 33. Control register 38 is coupled to prefetch circuitry 40, which is coupled to buffers 42. Buffers 42 includes a buffer 44 and a buffer 46. Although only one peripheral 18 is illustrated in FIG. 1, data processing system 10 may include any number of peripherals coupled to system interconnect 22. Likewise, any number of masters and slaves may be coupled to system interconnect 22 and are not limited to those shown in FIG. 1. Note also that in one embodiment, all of data processing system 10 may be located on a single integrated circuit or within a same device. Alternatively, data processing system 10 may include any number of separate integrated circuits or separate devices interconnected with each other. For example, in one embodiment, the memory and memory controller (such as, for example, memory array 35 and memory array controller 36) may be located on one or more integrated circuits, separate from the rest of data processing system 10.

In one embodiment, bus master 12 and bus master 14 may be processors capable of executing instructions, such as microprocessors, digital signal processors, etc., or may be any other type of interconnect master, such as direct memory access (DMA) circuitry or debug circuitry. Peripheral 18 may be any type of peripheral, such as a universal asynchronous receiver transmitter (UART), a real time clock (RTC), a keyboard controller, etc. Note that other slaves 20 may include any type of interconnect slaves, such as, for example, a memory accessible by masters 12 and 14, as well as any type of peripheral which resides on the system bus, including the same types of peripherals as peripheral 18. I/O circuitry 16 may include any type of I/O circuitry which receives or provides information external to data processing system 10.

In the illustrated embodiment, memory array controller 36 and memory array 35 correspond to another slave coupled to system interconnect 22. Note that in alternate embodiments, memory array 35 can include any number of arrays. Note also, in alternate embodiments, memory array 35 may be referred to as a shared storage 35 since it is storage which is shared by at least two masters coupled to system interconnect 22 (such as, for example, masters 12 and 14). Memory array 35 may be located on a same integrated circuit as masters 12 and 14 or on a separate integrated circuit. Furthermore, memory array 35 may be any type of memory, such as, for example, a read only memory (ROM), a random access memory (RAM), non-volatile memory (e.g. Flash), etc. Also, memory array 35 may be a memory or other storage located within another peripheral or slave.

System interconnect 22 interconnects master 12, master 14, I/O circuitry 16, peripheral 18, other slaves 20, and memory array controller 36. In one embodiment, as illustrated in FIG. 1, system interconnect 22 is implemented as a system bus operating according to a system bus protocol. Alternatively, system interconnect 22 can be implemented using interconnect circuitry, such as, for example, switching circuitry, which routes information between the various devices.

In operation, masters 12 and 14 request access of system interconnect 22 to request access to other slaves 20, to peripherals 18, or to memory array 35 via memory array controller 36. A requesting master can provide an access request, via system interconnect 22, to memory array controller 36. The access request can be, for example, a read request or a write request for either data or instructions. Memory array controller 36, in response to a read access request, provides the requested information (data or instructions) back to the requesting master via system interconnect 22. Note that the read access request from a requesting master may also be referred to as a demand fetch. In one embodiment, for an access request, a master identifier 26 is provided to memory array controller 36 which identifies which master is requesting the current access. R/W signal 28 is also provided to memory array controller 36 to indicate whether the current access request is for a read or a write type of access. Burst signal 30 is provided to memory array controller 36 to indicate whether the current access request is a burst or a non-burst type of access. For example, a non-burst type of access may include a single beat read or write. Instruction/data signal 32 is provided to memory array controller 36 to indicate whether the current access request is for an instruction or data. Memory array controller 36 also receives address information corresponding to the current access request and provides the requested information via address/data 27. Any other signals needed to communicate to and from memory array controller 36 may be provided within other signals 34.

In one embodiment, the width of conductors 33 between memory array 35 and memory array controller 36 is greater than the width of system interconnect 22. For example, in one embodiment, system interconnect 22 is only one-fourth the width of conductors 33 meaning that a single burst transaction of 4 data or instruction items can be obtained in a single access from memory array 35. For example, conductors 33 may be 256 bits wide while system interconnect 22 and the data or instruction items are only 64 bits wide. However, note also that generally, the access time to retrieve information from memory array 35 is much greater (e.g. 4 to 5 times greater) as compared to other peripherals, slaves, or masters coupled to system interconnect 22. Therefore, in order to reduce access time, memory array controller 36 may prefetch information from memory array 35 and store it within buffers 42.

For example, in one embodiment, prefetch circuitry 40 may prefetch information from memory array 35 into buffers 42, such as buffer 44 and buffer 46, which, in embodiment, may each be 256 bits wide. Therefore, in response to an access request from a requesting master, memory array controller 36 may be able to provide the requested information from buffers 42 (if the information was already prefetched) rather than having to fetch the information from memory array 35, which generally has a longer access time as compared to buffers 42. In one embodiment, prefetch circuitry includes tag portions (not shown) corresponding to each of buffers 44 and 46, and comparison circuitry (not shown) in order to determine whether the information being requested in a current access request is already located in one of buffers 44 and 46. For example, prefetch circuitry can compare the incoming address corresponding to the current access request via address/data 27 with the tag portions to determine whether or not the information has already been prefetched. If not, memory array controller 36 can provide the requested information from memory array 35.

In the illustrated embodiment, two buffers are illustrated (buffer 44 and buffer 46). However, in alternate embodiments, buffers 42 may include any number (one or more) of buffers. In one embodiment, prefetch circuitry may prefetch information from memory array 35 into one of buffers 44 and 46 while providing information to a requesting master from another one of buffers 44 and 46. That is, the use of more than one buffer allows for a prefetch to memory array 35 to occur at least partially simultaneously with servicing an access request from a requesting master. Also, note that in one embodiment, the buffer may have the same width as conductors 33, but in alternate embodiments, the widths may be different.

Since providing information from buffers 42 has a reduced access time as compared to accessing memory array 35 for responding to an access request from a requesting master, it is desirable to prefetch information from memory array 35 into buffers 42 that will subsequently be requested. However, note that prefetching is speculative in that it is uncertain whether the prefetched information will actually be requested by a master. If the prefetched information is not subsequently requested, then the prefetch becomes a wasted prefetch which consumes excess power and lowers performance. In one embodiment, prefetching may also interfere with demand fetches (which are non-speculative, such as those actually requested by a master). For example, during a prefetch, a demand fetch from a requesting master may have to wait on completion of the prefetch before it can be serviced, thus increasing latency of the demand fetch and increasing average access latency. Furthermore, if that prefetch turns out to be a wasted prefetch, then the time used for the prefetch was unnecessarily wasted, thus further increasing average access latency. Therefore, one embodiment of the present invention controls prefetching of speculative data into buffers 42 in order to reduce average access latency.

Still referring to FIG. 1, prefetch circuitry 40 can selectively control prefetching into buffers 42 based on control register 38. For example, in one embodiment, prefetch circuitry 40 determines, based on control register 38, a prefetch operation triggered by an access request to memory array 35 from a requesting master (such as master 12 or 14). Therefore, different types of prefetch operations can be triggered by different types of access attributes, which may include, for example, which master is requesting the access, whether the access request is part a burst access or not, whether the access request is for data or instructions, or any combination thereof. Therefore, based on the values of master identifier 26, R/W signal 38, burst signal 30, and instruction/data signal 32 corresponding to a current access request (i.e. a current demand fetch) and control register 38, prefetch circuitry 40 determines a prefetch operation that is triggered by the current access request.

FIG. 2 illustrates one embodiment of control register 38 which includes one data prefetch enable (DPEN) field and one instruction prefetch enable (IPEN) field for each master. For example, as illustrated in FIG. 2, control register 38 includes master 12 DPEN field 60, master 14 DPEN field 62, master 12 IPEN field 64, and master 14 IPEN field 66. Therefore, in alternate embodiments, control register 38 may include more or less fields, as needed, to store the desired prefetch control information. Also note that control register 38 may be programmed via instructions from a master such as master 12 or 14 coupled to system interconnect 22. The values may be provided, for example, by a user or may be programmed at design time.

FIG. 3 illustrates one embodiment of the field definitions of control register 38 of FIG. 2. For example, in one embodiment, each of fields 60, 62, 64, and 66 are two-bit fields, where each field is capable of having 4 values (00, 01, 10, and 11). As described in FIG. 3, DPEN fields 60 and 62 are used to control whether a data prefetch operation is triggered based on which master requested the access and also enables or disables prefetching initiated by a data read access. A master identifier (which can be used to determine which master requested the access) is provided, for example, by master identifier 26 of FIG. 1. In one embodiment, master 12 may have an identifier of 0 and master 14 may have an identifier of 1. Therefore, each master can be assigned a unique identifier. In an alternate embodiment, some masters may share a same identifier. Also, note that in alternate embodiments, which master is requesting the access may be determined in different ways rather than by providing a signal such as master identifier 26.

In the example of FIG. 3, each of DPEN fields 60 and 62 are two-bit fields where a value of 00 indicates that no prefetching is triggered by a data read access from the corresponding master. That is, if master 12 DPEN field 60 is set to 00, then no prefetching is triggered by a data read access from master 12. Similarly, if master 14 DPEN field 62 is set to 00, then no prefetching is triggered by a data read access from master 14. Note that whether the current access request is a read or a write request can be indicated to prefetch circuitry 40 by R/W signal 28, and that whether the current access request is for data or instructions can be indicated to prefetch circuitry by instruction/data signal 32. A value of 01 for DPEN fields 60 and 62 indicates that prefetching may be triggered only by a data burst read access from the corresponding master. That is, if master 12 DPEN field 60 is set to 01, then prefetching may be triggered only by a data burst read access from master 12. Whether the current access is a burst read access or not may be indicated to prefetch circuitry 40 by burst signal 30. A value of 11 for DPEN fields 60 and 62 indicates that prefetching may be triggered by any data read access from the corresponding master. That is, if master 12 DPEN field 60 is set to 11, then prefetching may be triggered by any data read from master 12. (Note that in this embodiment, the value of 10 is reserved and is not being used to set a prefetch operation). Therefore, data prefetch operations from memory array 35 triggered by a data access request from master 12 can be determined and controlled based on DPEN field 60. Also note that a data prefetch operation, as used herein, may include selectively performing a prefetch or performing no prefetch.

In the example of FIG. 3, each of IPEN fields 64 and 66 are two-bit fields where a value of 00 indicates that no prefetching is triggered by an instruction read access from the corresponding master. That is, if master 12 IPEN field 64 is set to 00, then no prefetching is triggered by an instruction read access from master 12. Again, as described above, R/W signal 28 and instruction/data signal 32 may be used to indicate to prefetch circuitry 40 whether the current access is a read or write access, and whether the current access is requesting instructions or data. A value of 01 for IPEN fields 64 and 66 indicates that prefetching may be triggered only by an instruction burst read access from the corresponding master. That is, if master 12 IPEN field 64 is set to 01, then prefetching may be triggered only by an instruction burst read access from master 12. A value of 11 for IPEN fields 64 and 66 indicates that prefetching may be triggered by any instruction read access from the corresponding master. That is, if master 12 IPEN field 60 is set to 11, then prefetching may be triggered by an instruction read access from master 12. Therefore, instruction prefetch operations from memory array 35 triggered by an instruction access request from master 12 can be determined and controlled based on IPEN field 64. Also note that an instruction prefetch operation, as used herein, may include selectively performing a prefetch or performing no prefetch.

In alternate embodiments, note that control register 38 may include more or less fields for each master with more or less bits, as needed. Also, the settings described in FIG. 3 for the fields of control register 38 are provided as an example. Alternate embodiments may determine prefetch operations triggered by either data access requests, instruction access requests, or both, based on different attributes than those provided in FIG. 3, more attributes that those of FIG. 3, or a subset of those in FIG. 3. For example, in one embodiment, prefetches may be triggered based only on the identifier of the master currently requesting the access. Alternatively, prefetches may be triggered based only on whether the access request is a burst or non-burst access, regardless of the identifier of the master current requesting the access. Also note that in alternate embodiments, the particular attributes for a current access request can be indicated to prefetch circuitry 40 in a variety of ways other than by signals 28, 30, and 32 illustrated in FIG. 1.

Figure 4:
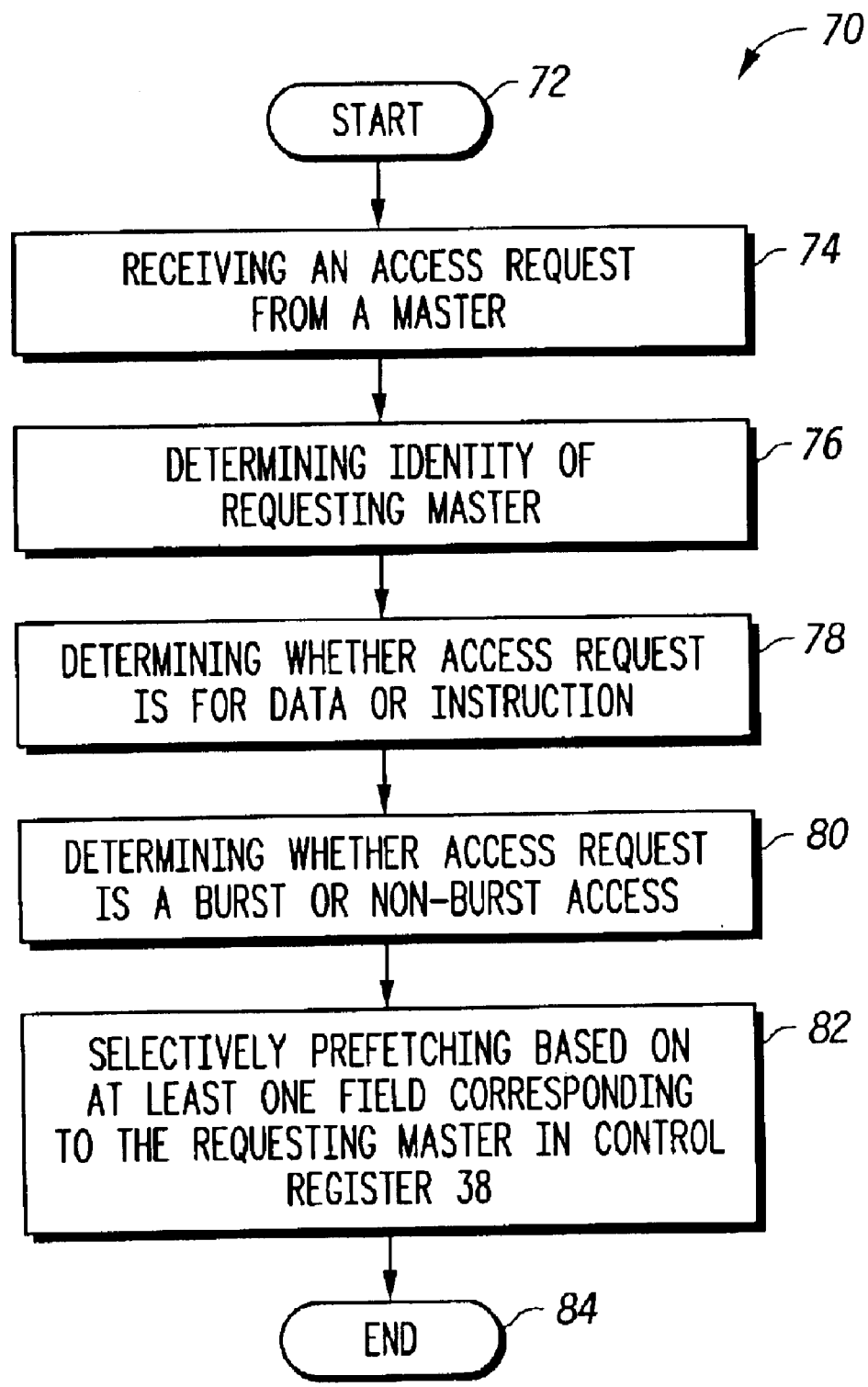
FIG. 4 illustrates, in flow diagram form, operation of the data processing system of FIG. 1 in accordance with one embodiment of the present invention.

FIG. 4 illustrates, in flow diagram form, operation of data processing system 10 in accordance with one embodiment of the present invention. Flow 70 begins with start 72 and proceeds to block 74 where an access request from a master is received. This access request can be many different types of request such as a read request, a write request, a burst request, a non-burst request, a request for data, a request for instructions, etc. Flow then proceeds to block 76 where the identity of the requesting master is determined. For example, in the embodiment of FIG. 1, this is done by providing master identifier 26. Flow then proceeds to block 78 where it is determined whether the access request is for data or instructions (which can be done, in one embodiment, by providing instruction/data signal 32). Flow then proceeds to block 80 where it is determined whether the access request is a burst or a non-burst access (which can be done, in one embodiment, by providing burst signal 30). Flow then proceeds to block 82, where based on the access attributes determined in blocks 76, 78, and 80, a prefetching operation is determined. That is, in block 82, prefetching is selectively performed based on at least one field corresponding to the requesting master in control register 38. For example, if the access request is determined to be from master 12, and the access request is for an instruction, then the prefetch operation triggered by the access request is performed as determined by the control information within master 12 IPEN field 64. Flow then ends at end 84.

Note that in an alternate embodiment, flow 70 may include only one or two blocks of blocks 76, 78, and 80. For example, only block 76 or only block 80 of blocks 76, 78, and 80 may be present such that the prefetching is based only on the identity of the requesting master or whether the access is a burst or non-burst access. Alternatively, flow 70 may include more determinations such that the selective prefetching is based on more attributes than those corresponding to blocks 76, 78, and 80.

Therefore, it can be appreciated how prefetch operations can be triggering based on various types of access attributes such that performance can be increased and wasted prefetches can be minimized. The embodiments described herein can be used to control prefetch operations triggered by an access request in a variety of different ways and applications. For example, in one embodiment, it may be beneficial to restrict prefetch triggering to instruction access requests made by a processor which executes instructions (such as, for example, by a central processing unit (CPU)), since data fetches may be randomly distributed while instruction fetches are generally sequential. Therefore, in this example, control register 38 can be set up such that only instruction access requests from the processor trigger a prefetch because it is likely that the prefetch will not be wasted since instructions are generally sequential. Furthermore, in many control code applications (such as in automotive applications), even branches generally appear as sequential because the branches are generally short forward branches which still fall within the buffer prefetch size (which, in one embodiment, is 256 bits). Therefore, the fields within control register 38 may be used to implement this selective prefetch policy.

In another example, where a direct memory access (DMA) device is the requesting master, data prefetching may be of benefit since normally a DMA is performing data transfers such as moving blocks of data that are sequential. Therefore, the fields within control register 38 may be set such that data access requests from the DMA trigger a prefetch to memory array 35. In yet another example, where debug circuitry capable of performing debug operations is the requesting master (where debug circuitry may be a master coupled to system interconnect 22, or may reside within a master coupled to system interconnect 22), it may be desirable to inhibit prefetching all together since interference with other masters or with the system in general is generally not desired. That is, for debug, minimal impact to the system usually results in more accurate debugging. Furthermore, performance during debug operations is generally non-critical.

In yet another example, if current read accesses are single-beat reads, it may be desirable to disable prefetching since the initial demand fetch will cause multiple data or instruction items to be fetched in the case where the buffers (such as buffers 44 and 46) are wider than the operand or data size. That is, for example, in one embodiment, the buffer is 256 bits wide which holds multiple instructions or data items such that sequential accesses (e.g. sequential single-beat reads) would hit in the buffer used to hold the original information that was loaded into the buffer. In this case, a prefetch would be wasteful, since more than likely, the next prefetch line would not be needed.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The terms a or an, as used herein, are defined as one or more than one. The terms including and/or having, as used herein, are defined as comprising (i.e., open language). As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A data processing system, comprising:

interconnect;

a first interconnect master, coupled to the interconnect;

a second interconnect master, coupled to the interconnect;

shared storage, coupled to the interconnect, for use by the first interconnect master and the second interconnect master;

a first control storage circuit which corresponds to the first interconnect master;

a second control storage circuit which corresponds to the second interconnect master; and prefetch circuitry, coupled to the first control storage circuit and to the second control storage circuit, said prefetch circuitry selects one of the first and second control storage circuits based upon which one of the first and second interconnect masters is requesting an access to the shared storage, and said prefetch circuitry uses the selected control storage circuit to selectively restrict prefetches from the shared storage triggered by the access to the shared storage.

2. The data processing system as in claim 1, wherein the shared storage is a memory.

3. The data processing system as in claim 2, wherein the memory is a flash memory.

4. The data processing system as in claim 1, wherein the data processing system is formed on a single integrated circuit.

5. The data processing system as in claim 1, wherein the interconnect comprises at least one bus having a bus protocol.

6. The data processing system as in claim 1, wherein the first interconnect master executes instructions, and wherein the first control storage circuit and the prefetch circuitry selectively restrict prefetches to instruction accesses.

7. The data processing system as in claim 1, wherein the first interconnect master performs direct memory accesses, and wherein the first control storage circuit and the prefetch circuitry selectively restrict prefetches to data accesses.

8. The data processing system as in claim 1, wherein the first interconnect master performs debug operations, and wherein the first control storage circuit and the prefetch circuitry selectively restrict prefetches by preventing prefetches.

9. The data processing system as in claim 1, wherein the first control storage circuit and the prefetch circuitry selectively restrict prefetches by preventing prefetches for non-burst accesses.

10. The data processing system as in claim 1, wherein the interconnect comprises at least one conductor that identifies which one of the first and second interconnect masters is requesting the access to the shared storage.

11. The data processing system as in claim 1, wherein the access is a read access.

12. A method for providing prefetch control, the method comprising:
   receiving an access request to access storage;
   providing a prefetch control storage circuit to store prefetch burst access control information; and
   selectively initiating a prefetch to the storage, based upon the burst access control information and whether the access request is a burst access.

13. A method as in claim 12, further comprising:
   providing a first interconnect master; and
   providing a second interconnect master;
   wherein the step of providing a prefetch control storage circuit comprises selecting, based upon whether the access request is from the first interconnect master or the second interconnect master, one of a plurality of prefetch control storage circuits to provide the burst access control information.

14. A method as in claim 13, wherein the step of selectively initiating a prefetch to the storage comprises selectively initiating a prefetch to the storage, based upon the burst access control information, based upon whether the access request is a burst access, and based upon whether the access request is an instruction access or a data access.

15. A method as in claim 12, wherein the access request is a read access request.

16. A method as in claim 12, wherein the storage comprises flash memory.

17. A method for providing prefetch control in a data processing system, the method comprising:
   providing a first interconnect master;
   providing a second interconnect master;
   receiving an access request to access shared storage;
   selecting a prefetch control storage circuit based upon whether the access request is from the first interconnect master or the second interconnect master;
   using control information stored in the prefetch storage circuit to control a prefetch operation triggered by the access request to the shared storage, wherein using the control information stored in the prefetch storage circuit to control the prefetch operation triggered by the access request to the shared storage comprises selectively initiating a prefetch to the shared storage based upon whether the access request is a burst access.

18. A method as in claim 17, wherein the shared storage is a memory.

19. A method for providing prefetch control in a data processing system, the method comprising:
   providing a first interconnect master;
   providing a second interconnect master;
   receiving an access request to access shared storage;
   selecting a prefetch control storage circuit based upon whether the access request is from the first interconnect master or the second interconnect master;
   using control information stored in the prefetch storage circuit to control a prefetch operation triggered by the access request to the shared storage, wherein using control information stored in the prefetch storage circuit to control a prefetch operation triggered by the access request to the shared storage comprises selectively initiating a prefetch to the shared storage based upon whether the access request is an instruction access or a data access.

20. The data processing system as in claim 19, wherein the shared storage is a memory.

21. A method for providing prefetch control in a data processing system, the method comprising:
   providing a first interconnect master;
   providing a second interconnect master;
   receiving an access request to access shared storage;
   selecting a prefetch control storage circuit based upon whether the access request is from the first interconnect master or the second interconnect master;
   using control information stored in the prefetch storage circuit to selectively initiate a prefetch to the shared storage based on at least one access attribute of the access request.

22. The method of claim 21, wherein the at least one access attribute of the access request comprises whether the access request is an instruction access or a data access.

23. The method of claim 21, wherein the at least one access attribute of the access request comprises whether the access request is burst access.

* * * * *